UNITED STATES PATENT OFFICE.

WILLIS E. RAWSON, DECEASED, LATE OF NEWBURG, OHIO, BY CORA RAWSON, ADMINISTRATRIX, OF NEWBURG, OHIO.

SANITARY HOOF-PACKING.

1,067,757.        Specification of Letters Patent.     Patented July 15, 1913.

No Drawing.     Application filed November 9, 1911. Serial No. 659,443.

*To all whom it may concern:*

Be it known that WILLIS E. RAWSON, deceased, a citizen of the United States, late of Newburg, in the county of Cuyahoga and State of Ohio, did invent new and useful Improvements in Sanitary Hoof-Packings, of which the following is a specification.

The present invention relates to a sanitary hoof packing which is used to soften the hoofs of horses or other animals. The composition is about the consistency of lard, and it is a curative dressing for inflamed or hardened hoofs.

To the accomplishment of these and related ends, said invention, then, consists of the means hereinafter fully described and particularly pointed out in the claims.

The following description sets forth in detail one mode of carrying out the invention, such disclosed mode illustrating, however, but one of various ways in which the principle of the invention may be used.

This packing is composed chiefly of a soft paraffin wax, such as petrolatum, known in its commerical and purified form as vaseline, and a clay or impure iron ore such as yellow ocher. With these two substances is mixed a small amount of resin or similar substance, and smaller amounts of other substances are added for coloring and medicinal purposes.

In mixing the several substances, the petrolatum, ocher and resin are first heated together for several hours in a suitable vessel. After the mixture has somewhat cooled, a small amount of turpentine is added with which there is mixed a small amount of lampblack for coloring the compound. After still further cooling, a small percentage of blue vitriol is added for its medicinal effect. During the heating the petrolatum and resin would form two separate layers if the ocher were not added for the purpose of stiffening the mass and making it homogeneous. The turpentine is added for the purpose of dissolving any resin remaining in the solid state, and the lampblack and blue vitriol for the purposes above named. The temperature at which the composition will be kept during the heating will vary with the amount and nature of the substances used. It will be below the boiling point of any of the substances, and must, of course, be over 120 degrees Fahrenheit in order to liquefy the petrolatum.

The exact composition of the compound will vary according to the exact nature of the substances used in composing the same. Various substances may be used. Another paraffin wax may be used in place of the petrolatum, and other suitable clays in place of the ocher. The substances here named have been found to compose a very sanitary and lasting hoof packing which will retain its medicinal and sanitary properties for a long time. When the substances here named are used, the percentage composition by weight will be approximately as follows:—

Petrolatum _____ 64     per cent.
Yellow ocher _____ 24     " "
Resin _____ 10     " "
Turpentine _____ 1.75   " "
Lampblack _____ $\frac{1}{8}$ of 1 per cent.
Blue vitriol _____ $\frac{1}{8}$ of 1 per cent.

Of these various substances, lampblack is, of course, used for coloring purposes only and may be left out without affecting the good results to be obtained by the composition. The various other substances may be changed as above specified.

Other substances may be used replacing those here named, provided they accomplish the same purpose in the composition and do not materially alter the properties of the same.

I claim—

1. A hoof packing comprising approximately 64 per cent. by weight petrolatum, 24 per cent. yellow ocher, 10 per cent. resin, $1\frac{3}{4}$ per cent. turpentine, $\frac{1}{8}$ per cent. blue vitriol, combined substantially as herein described.

2. A hoof packing comprising approximately 64% by weight petrolatum, 24% yellow ocher, 10% resin, $1\frac{3}{4}$% turpentine, $\frac{1}{8}$% lamp black, and $\frac{1}{8}$% blue vitriol, combined substantially as herein described.

Signed by me this 7th day of November, 1911.

CORA RAWSON,
*Administratrix of the estate of Willis E. Rawson, deceased.*

Attested by—
    HORACE B. FAY,
    BLANCHE M. PRIEBE.